United States Patent
Lea et al.

(10) Patent No.: US 6,456,437 B1
(45) Date of Patent: Sep. 24, 2002

(54) OPTICAL SHEETS SUITABLE FOR SPREADING LIGHT

(75) Inventors: Michael C. Lea, Bracknell (GB); Charles A. Marttila, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/646,363

(22) Filed: Sep. 14, 2000

(30) Foreign Application Priority Data

Jan. 14, 1999 (GB) .............................................. 9900819

(51) Int. Cl.$^7$ ............................................. G02B 27/10
(52) U.S. Cl. ....................................... 359/625; 359/627
(58) Field of Search ................................. 359/625, 627

(56) References Cited

U.S. PATENT DOCUMENTS

| | | | |
|---|---|---|---|
| 586,220 A | 7/1897 | Basqun | 359/595 |
| D28,019 S | 12/1897 | Waller | 100/212 |
| 720,386 A | 2/1903 | Wadsworth | 359/593 |
| 818,208 A | 4/1906 | Wadsworth | 359/592 |
| 1,612,804 A | 1/1927 | Dorey | 362/340 |
| 3,068,754 A | 12/1962 | Benjamin | 359/592 |
| 4,056,094 A | * 11/1977 | Rosenberg | 126/698 |
| 4,411,493 A | 10/1983 | Miller | 359/595 |
| 4,755,921 A | * 7/1988 | Nelson | 362/307 |
| 5,029,060 A | 7/1991 | Abo et al. | 362/299 |
| 5,150,966 A | 9/1992 | Nelson | 362/337 |
| 5,467,208 A | 11/1995 | Kokawa et al. | 349/67 |
| 5,551,042 A | 8/1996 | Lea et al. | 359/742 |
| 5,579,134 A | * 11/1996 | Lengyel | 349/62 |
| 5,617,245 A | * 4/1997 | Milner | 359/402 |
| 5,655,830 A | 8/1997 | Ruskouski | 362/240 |
| 5,661,603 A | 8/1997 | Hanano et al. | 359/622 |
| 5,771,328 A | 6/1998 | Wortman et al. | 385/146 |
| 5,882,774 A | 3/1999 | Jonza et al. | 782/212 |
| 5,976,686 A | 11/1999 | Kaytor et al. | 428/317.9 |

FOREIGN PATENT DOCUMENTS

| | | |
|---|---|---|
| EP | 0 846 914 A1 | 6/1998 |
| GB | 759325 | 10/1954 |
| GB | 762769 | 12/1956 |
| JP | 6-82635 | 3/1994 |
| WO | 0 426 411 A2 | 5/1991 |
| WO | WO 97/31276 | 8/1997 |
| WO | WO 97/39369 | 10/1997 |
| WO | WO 98/48312 | 10/1998 |
| WO | WO 00/42351 | 7/2000 |

* cited by examiner

*Primary Examiner*—Georgia Epps
*Assistant Examiner*—Gary O'Neill
(74) *Attorney, Agent, or Firm*—Stephen W. Buckingham

(57) ABSTRACT

An optical sheet (25) for spreading light has a substantially smooth surface (27), and a structured surface (28) comprising an array of prisms (30, 31). A beam of light that is to be spread is directed through the film from the smooth surface. Some of the prisms (termed "refraction prisms") deviate normally-incident light only by refraction at a prism facet as the light leaves the film while others (termed "reflection prisms") deviates normally-incident light by total internal reflection within the prism before the light leaves the film. There are a plurality of reflection prisms (30) selected to deviate normally-incident light through different angles and a plurality of refraction prisms (31) selected to deviate the normally-incident light through different angles, and they are arranged, preferably in a non-ordered manner, so that successive reflection prisms are separated by at least one refraction prism. In alternative embodiments, the structured surface comprises a non-ordered arrangement of a plurality of reflection prisms selected to deviate normally-incident light through different angles, or a non-ordered arrangement of a plurality of refraction prisms selected to deviate normally-incident light through different angles.

17 Claims, 6 Drawing Sheets

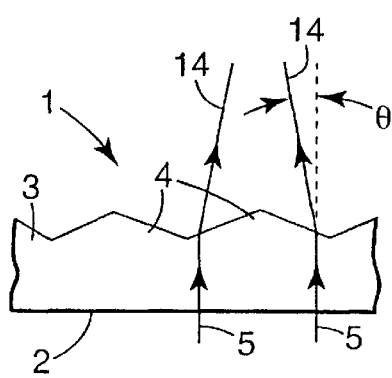
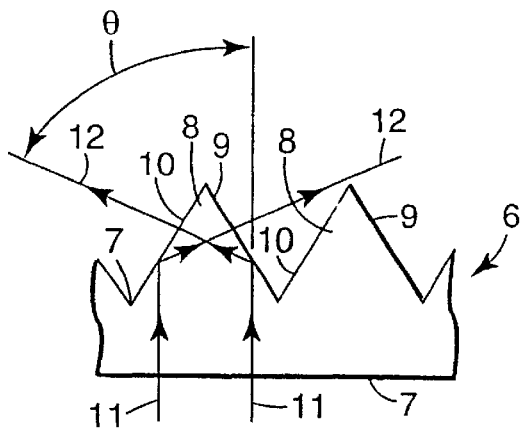
Fig. 1    Fig. 2
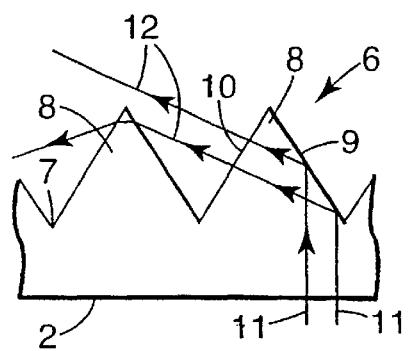
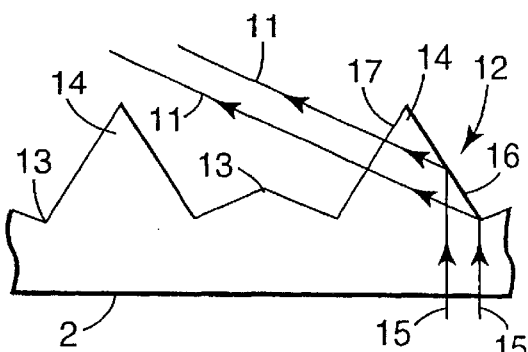
Fig. 3    Fig. 4
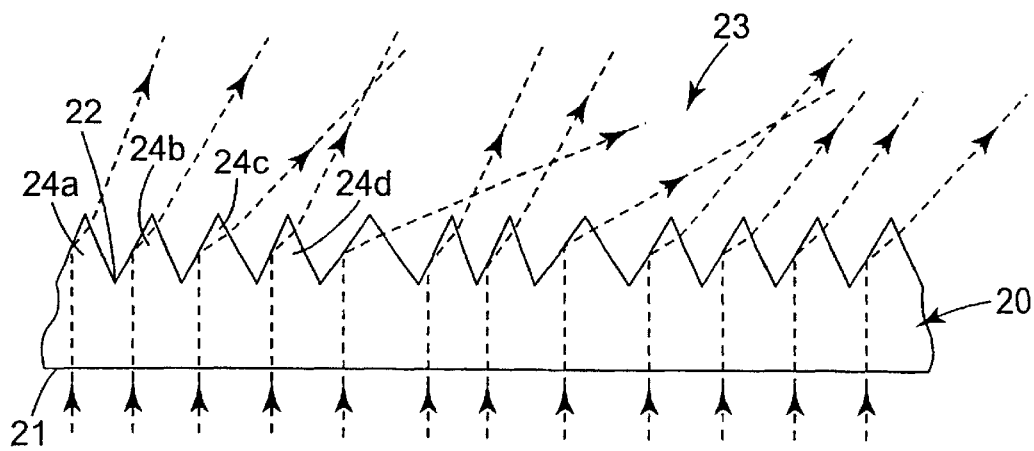
Fig. 5

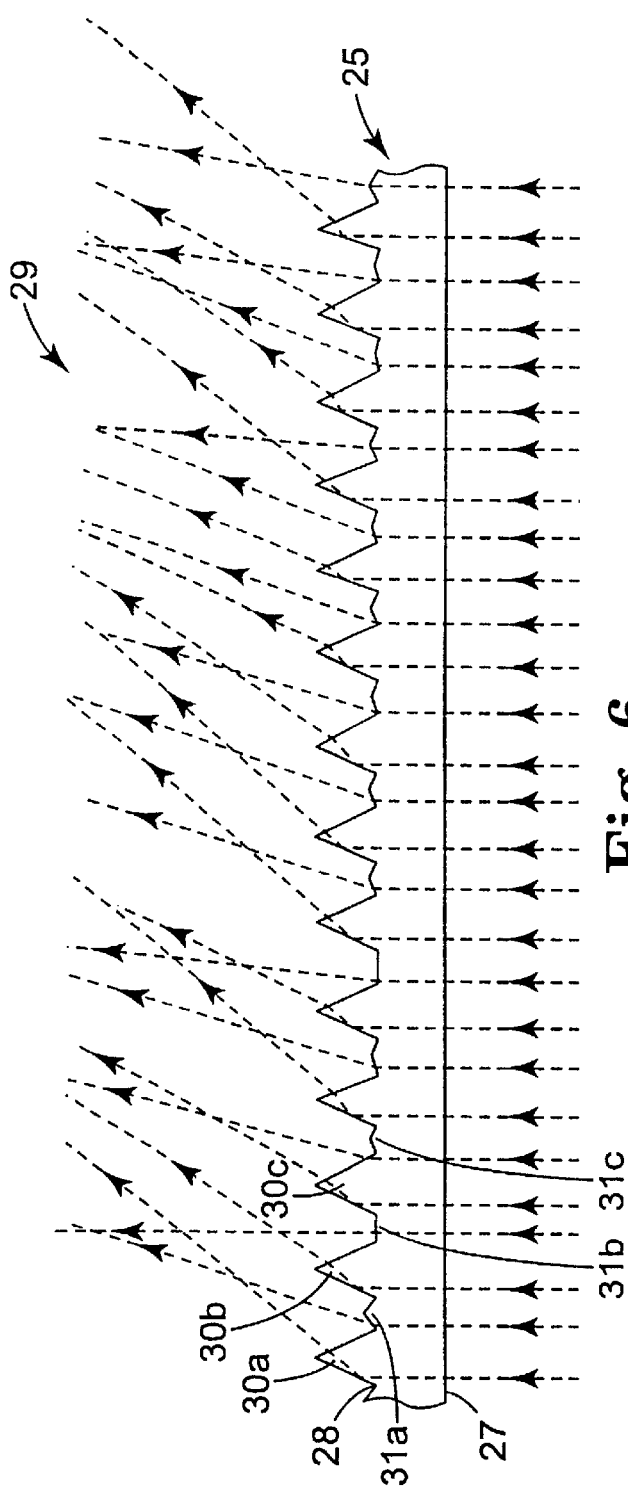
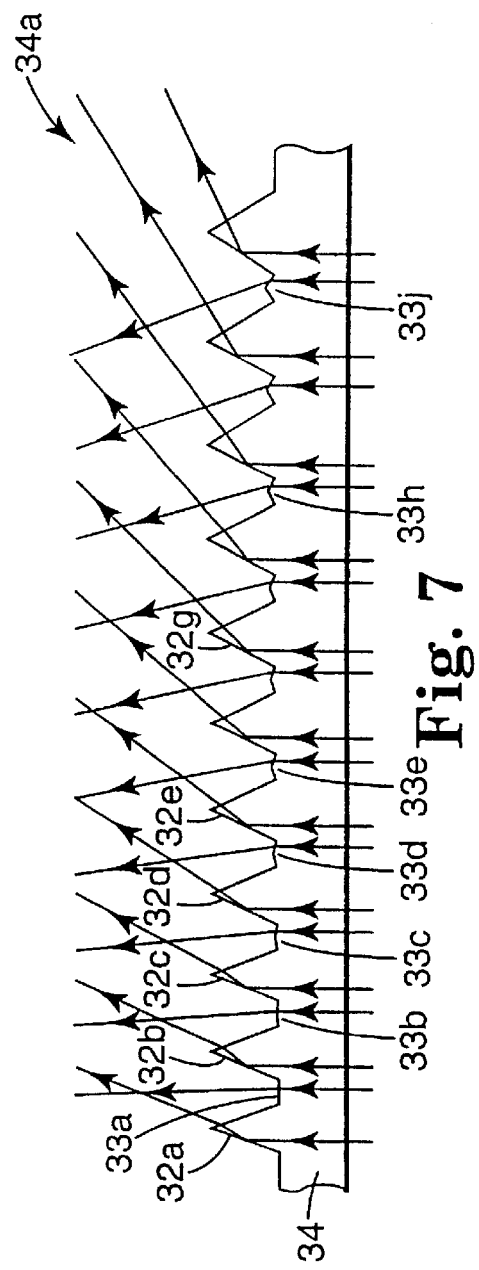
Fig. 6
Fig. 7

OPTICAL SHEETS SUITABLE FOR SPREADING LIGHT

BACKGROUND OF THE INVENTION

The present invention relates to optical sheets, for example films, suitable for use in spreading light.

A problem that is frequently encountered when an area is illuminated using artificial light sources or natural daylight is how to spread the light adequately and evenly. In the case, for example, in which the area that is being illuminated is a floor area within a building, there will usually be parts of the floor area that are less well lit than others, and also some locations where the users of the building are troubled by glare from the light source.

Simple diffusers in the form of a sheet of translucent material are often used to spread light but, although they are inexpensive, they do not transmit light efficiently and are also unable to direct light in a controlled manner to where it is needed.

U.S. Pat. No. 5,551,042 describes a structured optical film for use with skylights or dormer windows to provide improved illumination of the interior of buildings with natural daylight. The film is intended to be positioned at a window with the structured surface (which forms a plurality of negative Fresnel lenses) presented towards the sunlight and enables a reasonably uniform, non-glare illumination of a floor area of the building to be achieved.

Other structures, in the form of prism glass plates, for distributing daylight are described in U.S. Pat. Nos. 28,019, 586,220, 720,386 and 818,208.

Structured films and sheet materials have also been described for use in luminaires, to distribute the light from artificial sources. U.S. Pat. Nos. 5,150,966, 5,029,060 and 4,755,921, for example, describe the use of catadioptric Fresnel lenses in light fixtures: in each case, the lens is formed from a sheet of transparent material having a structured surface comprising prism structures. U.S. Pat. No. 1,612,804 and GB-A-762 769 describe luminaires with refractors that, on the surface remote from the light source, have a plurality of prisms for distributing the light in certain directions.

In the field of backlit optical displays, for example the liquid crystal displays used in portable personal computers, calculators etc., it is also known to use structured optical sheet materials to redirect the light passing through the display with a view to increasing the amount of light emitted in a direction approximately normal to the display. Examples of sheet materials intended for that purpose are described in U.S. Pat. Nos. 5,467,208 and 5,771,328.

BRIEF DESCRIPTION OF THE INVENTION

The present invention is concerned with the problem of spreading light in a controlled manner applicable to both natural and artificial light and, in the case of the latter, applicable not only to traditional incandescent and fluorescent light sources but also to more recently-developed light sources such as light emitting diodes (LEDs).

The present invention provides an optical sheet suitable for spreading light, in which a first major surface of the sheet is a structured surface comprising an array of prisms such that, if the second major surface of the film is substantially smooth, a normally-incident beam of light that enters the film through the second major surface and leaves through the array of prisms will be spread by the latter; wherein the array comprises:

(a) a plurality of reflection prisms selected to deviate the normally-incident light through different angles and a plurality of refraction prisms selected to deviate the normally-incident light through different angles, in which successive reflection prisms are separated by at least one refraction prism; or (b) a non-ordered arrangement of a plurality of reflection prisms selected to deviate the normally-incident light through different angles; or (c) a non-ordered arrangement of a plurality of refraction prisms selected to deviate the normally-incident light through different angles; in which each refraction prism deviates the normally-incident light only by refraction at a prism facet as the light leaves the film through the first major surface and each reflection prism deviates the normally-incident light by total internal reflection within the prism before the light leaves the film through the first major surface.

The present invention also provides an optical sheet suitable for spreading light, in which a first major surface of the sheet is a structured surface comprising an array of prisms and the second major surface of the sheet is substantially smooth, whereby a normally-incident beam of light that enters the film through the second major surface and leaves through the array of prisms will be spread by the latter;

wherein the array comprises:

a non-ordered arrangement of a plurality of reflection prisms selected to deviate the normally-incident light through different angles and a plurality of refraction prisms selected to deviate the normally-incident light through different angles, in which successive reflection prisms are separated by at least one refraction prism;

in which each refraction prism deviates the normally-incident light only by refraction at a prism facet as the light leaves the film through the first major surface and each reflection prism deviates the normally-incident light by total internal reflection within the prism before the light leaves the film through the first major surface.

Typically, the structured surface of an optical sheet in accordance with the invention comprises a multiplicity of reflection and/or refraction prisms selected to deviate the normally-incident light through respective angles.

The term "light" as used herein refers to electromagnetic radiation in the ultraviolet, visible and/or infra-red regions of the electromagnetic spectrum.

The term "prism" as used herein normally refers to a structure whose two ends are similar, equal and parallel rectilinear figures, and whose sides are parallelograms. In its simplest form, a prism has a triangular cross-section. However, as used herein, the term extends to structures having cross-sections with more than three sides and also to the limiting case in which the structure has a cross-section with a multiplicity of sides to the extent that at least some of those sides form a curve. In the case of refraction prisms, the term as used herein also includes the limiting case of a triangular prism with a vertex angle of 180° (equivalent to the absence of a prism).

As used herein, the term "non-ordered" when applied to a plurality of prisms that deviate light through different angles means that there is no discernible order or pattern in the manner in which those prisms are arranged.

BRIEF DESCRIPTION OF THE DRAWINGS

By way of example only, embodiments of the invention will be described with reference to the accompanying drawings, in which:

FIG. 1 shows an example of an optical sheet having a transmission structure not in accordance with the invention;

FIG. 2 shows an example of an optical sheet having a total internal reflection structure not in accordance with the invention;

FIG. 3 illustrates reduced transmission with the total internal reflection structure shown in FIG. 2;

FIG. 4 illustrates a modification of the arrangement shown in FIG. 3;

FIGS. 5 to 7 show examples of optical sheets in accordance with the invention;

DETAILED DESCRIPTION OF THE INVENTION

Figure 8:
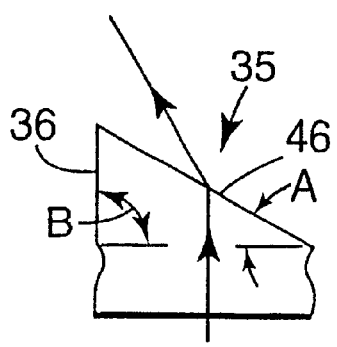
FIGS. 8 to 10 represent cross-sectional views of an asymmetric T cell, R cell and R2 cell respectively.

FIG. 1 shows an optical sheet 1 that can be used to deviate light. The sheet has a substantially smooth major surface 2 and a structured major surface 3 that comprises a plurality of identical prisms 4 extending parallel to one another perpendicular to the plane of the drawing. The prisms 4 are referred to herein as "refraction prisms" (or "T cells") and only two are shown in FIG. 1. Incident light 5 entering the sheet 1 through the smooth surface 2 normal to the latter, is refracted by the T cells 4 and thus angularly deviated as it exits the sheet 1.

This type of prism structure only transmits light efficiently for small bending (or exit) angles (in the range of 0 to about 30°). The exit angle is the angle η is the angle through which the light 5 is angularly deviated by the optical sheet 1, assuming the light 5 is incident normally on the smooth surface 2. Since the prisms 4 have identical, symmetrical, triangular cross-sections they will all deviate light through the same angle, to one side or the other of the normal to the smooth surface 2. At exit angles greater than about 30° internal reflection from the facets of the prisms 4 starts to occur and the efficiency of transmission of sheet 1 is decreased, because light is reflected back towards the smooth surface 2 and does not exit through the structured surface 3.

FIG. 2 shows a second example of an optical sheet 6 that can be used to deviate light. In this case the sheet includes a substantially smooth major surface 7 and a structured major surface that comprises a plurality of identical prisms 8 extending parallel to one another perpendicular to the plane of the drawing. The prisms 8 are referred to herein as "reflection prisms" (or "R cells") and only two are shown in FIG. 2. The R cells 8 can achieve exit angles ψ in the range of from 5 to 90° but are particularly suitable for achieving exit angles greater than 20°. Each prism 8 includes a facet 9 and a facet 10. Light 11 incident normally on the smooth surface 7 passes into the sheet 6 undeviated before striking one of the facets 9, 10 and undergoing total internal reflection to exit through the opposite facet 10, 9 to form an angularly deviated exit beam 12. Since the prisms 8 have identical, symmetrical, triangular cross-sections they will all deviate light through the same angle, to one side or the other of the normal to the smooth surface 7. There are also some disadvantages with the R cell arrangement shown in FIG. 2. In particular, for normally-incident collimated light and exit angles greater than 60°, a certain proportion of the light 12 exiting the sheet through one R cell is intercepted by an adjacent R cell which reduces the transmission efficiency of the sheet 6. This problem is illustrated in FIG. 3 where it can be seen that light 11 striking the lower portion of facet 9 of one prism is intercepted by the adjacent prism after exiting the sheet through facet 10. If the incident light 11 is not collimated or is not incident normally on the sheet, this effect is apparent at even lower exit angles.

FIG. 4 is similar to FIG. 3 but shows a T cell 13 positioned between two R cells 14. Due to the increased separation of the R cells 14 caused by the presence of the T cell 13, light 15 striking the lower portion of one facet 16 of an R cell exists through the other facet 17 and is not intercepted by the adjacent R cell 14. Provided that the T cell 13 of FIG. 4 is selected to provide an exit angle θ of less than 30°, a sheet comprising prism structures 13, 14 of this type will transmit light comparatively efficiently. Light that enters the T cell 13 will be deviated through the angle θ, and light that enters the R cells 14 will be deviated through the larger angle ψ.

Generally, when a collimated light beam is incident normally on the smooth major surface of any of the sheets shown in FIGS. 1, 2 and 4, each prism on the structured surface will produce two output beams at angles determined by the facet angles of the prism (e.g. in the sheet of FIG. 2 by the inclination of the prism facets 9, 10). By using, in this structured surface, an array of prisms providing a variety of facet angles across the sheet, a mixture of output beams at different angles can be produced. In other words, the angular distribution of the light emerging from the sheet is determined in a readily predictable manner by the variety of facet angles in the prism array. Consequently, it is possible to determine the spectrum of facet angles required on the structured surface of the sheet to produce a particular angular distribution in the light emerging from the sheet. A set of T and/or R cells to match that spectrum can then be derived mathematically, having regard to the particular circumstances of the case (i.e. factors such as the refractive index of the sheet material and the incidence angle(s) of the incoming light). If the incoming beam is collimated and incident normally on the smooth surface of the sheet and only a narrow spread (less than about 60°) in the emerging light beam is required (corresponding to a deviation of about 30° on either side of the normal to the smooth surface of the sheet), it may be possible to achieve a required angular distribution of the emerging light using either only T cells or only R cells on the structured surface of the sheet. A mixture of T and R cells could also be used. If it is desired to spread the beam through an angle of no more than about 120° (corresponding to a deviation of about 60° on either side of the normal to the smooth surface of the sheet), then it may be possible to achieve a required angular distribution in the emerging light using only R cells on the structured surface of the sheet although, again, a mixture of T and R cells could also be used. If, however, the incoming beam is not collimated or is not incident normally on the sheet, or if a wide angle spread is desired, then a mixture of R and T cells will generally be essential (with T cells being used to separate R cells as illustrated in FIG. 4). In that case, the low angle spreading of the light can be effected by the T cells and the higher angle spreading by the R cells. When the required set of cells has been determined, they can be arranged across the surface of the sheet in different ways, as will be described below.

In the simplest case, in which cells of one type only (i.e. only T cells or only R cells) are used on the structured surface of the sheet in accordance with the invention, the prisms providing the required spectrum of facet angles should be arranged in a non-ordered way across the surface of the sheet (although that array itself may be repeated as often as necessary to achieve the required sheet area or may be used in combination with other prism arrays). By using a non-ordered arrangement of prisms that deviate light through different angles, focussing of the light passing through the sheet is avoided: that is particularly important when the light is sunlight because any focussing of the sun's rays will give rise to hot spots that could constitute a safety (especially fire) hazard. From the viewpoint of an observer looking at the sheet from the side opposite the light source (i.e. an observer on the structured side of the sheet), a non-ordered arrangement of the prisms also helps to reduce glare.

FIG. 5 illustrates, on a greatly-enlarged scale, a light spreading sheet 20 of that type. The sheet has a smooth major surface 21, and a structured major surface 22 comprising an array 23 of a multiplicity of reflection prisms (24a, 24b, 24c . . . ) that deviate light through different angles selected to provide a particular angular distribution in the light emerging from the sheet (as illustrated by the light rays shown in dotted lines). The prisms 24 of the array 23 are arranged across the sheet 20 in a non-ordered manner. FIG. 5 illustrates a particular case in which the manufacturing process used to produce the sheet 20 optimally produces prisms 24 that are of the same height with the valleys between them all being of the same depth. Consequently, the prisms 24 must be of different widths to provide the required variety of facet angles. That is not essential, however, and other manufacturing processes will permit the production of sheets in which the prisms 24 are of different heights and/or the valleys between them are of different depths. In some cases, successive prisms 24 may be spaced apart from each other, for example by identical refraction prisms. The array 23 may be repeated across the sheet 20 if that is necessary to achieve a desired sheet area. Alternatively, the array 23 may be combined with one or more prism arrays of another type.

In the case in which a mixture of T and R cells is used on the structured surface of a sheet in accordance with the invention, the prisms providing the required spectrum of facet angles should be arranged across the surface of the sheet with successive reflection prisms separated by at least one refraction prism (although that array of prisms may be repeated as often as necessary to achieve the required sheet area, or may be used in combination with other prism arrays). Subject to that, however, the T and R cells may be arranged either in an ordered or a non-ordered way depending on the intended use of the sheet, as will be described below with reference to FIGS. 6 and 7 which show, by way of example, optical sheets comprising T and R cells arranged generally in the manner illustrated in FIG. 4.

The sheet 25 of FIG. 6 (also shown on a greatly-enlarged scale) has a smooth major surface 27 and a structured surface 28 providing light spreading characteristics (as illustrated by the light rays shown in dotted lines). The structured surface comprises an array 29 of prisms including a number of R cells (30a, 30b, 30c . . . ) each adjacent pair of which is separated by a respective T cell (31a, 31b, 31c . . . ). The prisms of the array 29 deviate light through different angles selected to provide a particular angular distribution in the light emerging from the sheet: typically, the T cells 31 are used to deviate the light through different angles less than about 30° and the R cells 30 are used to deviate the light through different angles greater than about 20°. Most importantly, however, the prisms in the array 29 are arranged in a non-ordered way. For manufacturing reasons, the R cells 30 are all of the same height (and, consequently, of varying width) while the T cells 31 are all of the same width (and, consequently, of varying height). The array 29 may be repeated across the sheet 25 if that is necessary to achieve a desired sheet area. Alternatively, the array 29 may be combined with one or more prism arrays of another type for example, of the type shown in FIG. 5.

The mixture of T and R cells used in the sheet of FIG. 6 enables the sheet to function efficiently to transmit and spread light through a wide angle. By using a non-ordered arrangement of prisms that deviate light through different angles, focussing of the light passing through the sheet is avoided: as already explained, that is particularly important when the light is sunlight because any focussing of the sun's rays will give rise to hot spots that could constitute a safety (especially fire) hazard. From the viewpoint of an observer looking at the sheet from the side opposite the light source (i.e. an observer on the structured side of the sheet), the non-ordered arrangement of the prisms also helps to reduce glare.

The sheet 34 of FIG. 7 differs from the sheet 25 of FIG. 6 in that the R cells 32 and the T cells 33 of the prism array 34A are arranged in an ordered way, namely in order of increasing exit angle going from the left side to the right side of the Figure. For manufacturing reasons, as for the sheet 25 of FIG. 6, the R cells 32 are all of the same height (and, consequently, of varying width) while the T cells 33 are all of the same width (and, consequently, of varying height). Hence, R cell 32a has the narrowest width and R cell 32k has the greatest width of those shown in the figure while T cell 33a has the lowest height and T cell 33j has the greatest height. It should be noted that a more efficient design may be possible in which the width of each T cell 33 is adjusted according to the adjacent R cell 32. In addition, for R cells 32 where the exit angle is less than 60° (or lower angles for non-collimated light) it may not be necessary to have an adjacent T cell 33. However, R cells 32 having a large exit angle (such as R cell 32k) will require the widest T cell 33.

The sheet 34 of FIG. 7 is also capable of transmitting and spreading light efficiently although with an increased risk of hot spots and an increased level of glare. There may, however, be situations in which these factors do not present substantial problems, for example when the sheet is used to spread natural light entering a greenhouse.

In both FIGS. 6 and 7, a T cell (31, 33) may be completely flat i.e. have no height, corresponding to a vertex angle of 180°.

Figure 9:
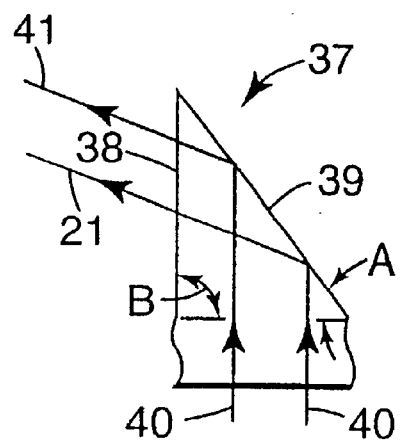
Figure 10:
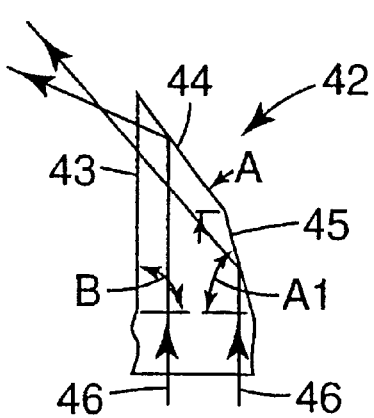

FIGS. 8 to 10 show examples of three possible alternative prism shapes suitable for use in optical sheets in accordance with the invention. FIG. 8 shows a T cell asymmetric structure 35 having one facet 36 substantially normal to the surface of the sheet, which is suitable for deviating light to one side of the normal through angles in the range of from 0 to about 30°. FIG. 9 shows an R cell asymmetric structure 37 having a facet 38 which is substantially normal to the surface of the sheet and another facet 39 at an angle to the first facet which provides an internal surface on the structure for total internal reflection of the incoming light 40. The asymmetric R cell 37 is also suitable for deviating light to one side of the normal, as shown by the exiting light 41, in this case through angles in the range of about 20 to 45°. FIG. 10 shows an R cell structure 42 having one facet 43 which is substantially normal to the surface of the sheet and two opposite facets 44, 45 with the upper facet 44 being at a higher angle to the normal of the surface of the sheet than the lower facet 45. Hence, incoming light 46 reflected from the lower facet 45 exists the structure 42 at an exit angle which is less than the exit angle of light reflected from the upper facet 44. The R cell 42 is suitable for deviating light to one side of the normal through angles from between about 30 and 90°.

Figure 11:
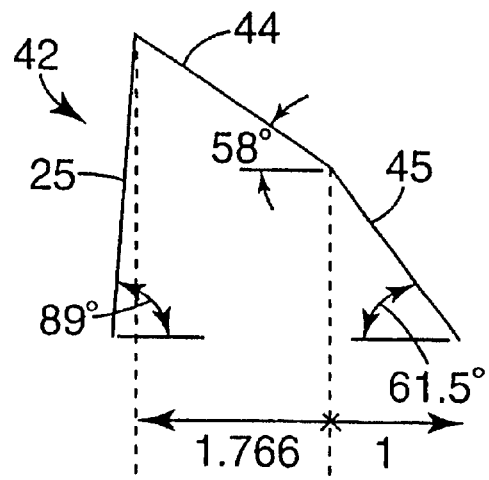
FIG. 11 is a detailed cross-sectional view of a prism structure of the type shown in FIG. 10.

In each of the cells 35, 37, 42 shown in FIGS. 8 to 10, the angle "B" of the facets 36, 38, 43 should be substantially equal to 90° to minimise the amount of light which hits this facet. Typically, the angle "B" may be 89°. Where the refractive index of the sheet material is 1.492 then to obtain an exit angle of 10° for the T cell shown in FIG. 8, the angle "A" of the other-facet 46 should be 19°. For the R cell 37 shown in FIG. 10, with exit angles of 50° and 36.8°, angle "A1" of the facet 45 should be 61.5°, angle "A" of the facet 44 should be 58° and the relative lengths of the facets 44, 45 projected onto the surface of the sheet should be 1.766:1 as shown in FIG. 11.

To produce a given angular distribution using sheets having asymmetric structures as illustrated in FIGS. 8 to 10, a range of facet angles may be mixed together with interleaved T and R cells as described above with reference to FIGS. 6 and 7 or with a mixture of R cells.

The prism of FIG. 10 could be modified by increasing the number of inclined facets (such as facets 44, 45) from which the incoming light 46 is reflected. In the limiting case, some at least of those inclined facets will form a curve. The use of a plurality of inclined facets (such as the facets 44, 45 of FIG. 10) is not restricted to asymmetric prisms and could be applied to symmetric prisms also.

Figure 12:
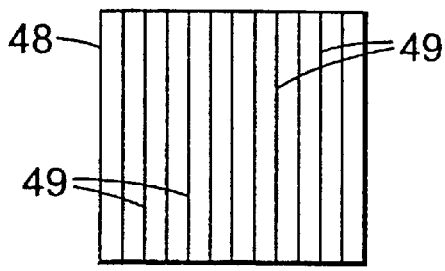
FIG. 12 is a diagrammatic plan view of an optical sheet in which the prism structures are linear.
Figure 13:
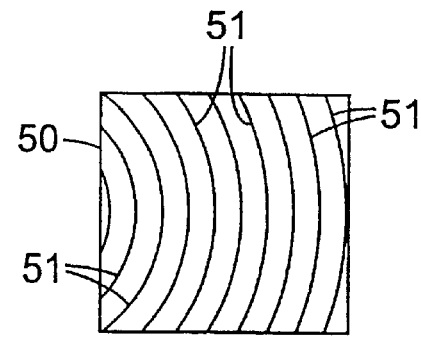
FIGS. 13 to 15 are diagrammatic plan views of optical sheets in which the prism structures follow other paths.
Figure 14:
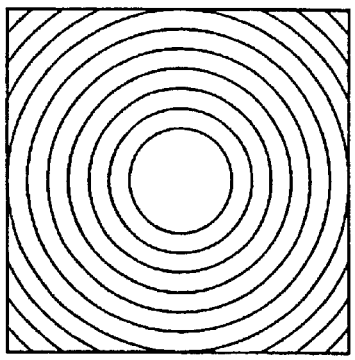
Figure 15:
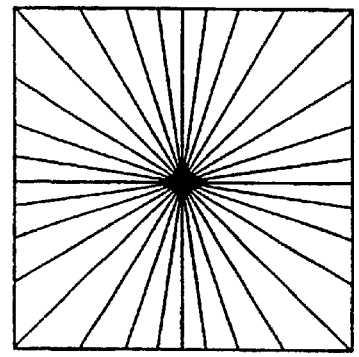

FIG. 12 is a diagrammatic plan view of a sheet 48 of the type described above with reference to FIGS. 5 to 7, in which the prisms 49 extend linearly across the sheet. This sheet will have the effect of spreading light in one direction, at right angles to the direction of extent of the prisms 49. A diagrammatic plan view of an alternative sheet 50, also of the type described above with reference to FIGS. 5 to 7 but in which the prisms 51 follow a curved path, is shown in FIG. 13. This sheet will add some symmetrical spread in the transverse direction to the light passing through it. Generally, it is possible for the prism structures to follow paths of any shape including, for example, paths that form a set of concentric circles on the sheet as illustrated diagrammatically in FIG. 14 or that radiate from a central location as illustrated in FIG. 15. If two sheets of the general type shown in FIG. 12 are overlapped with the prism structures 49 running at right angles to each other, the resulting structure will divert light in two dimensions. As described later, such a structure can provide an aesthetically pleasing effect, as well as an effective distribution of light, when used as the final optical element in a luminaire so that it forms the surface of the luminaire that is visible to an observer. Other effects can be achieved using two sheets on which the prismatic structures follow other paths (including curved paths) such that, when the sheets are overlapped, the prismatic structures are mutually orthogonal. For example, a sheet of the type shown in FIG. 14 could be used with a sheet of the type shown in FIG. 15.

Sheets in accordance with the invention can be of any suitable thickness and formed from any suitable material. They may, for example, be formed as flexible films but they can also be formed as more rigid sheets. Examples of materials from which the sheets can be formed are acrylic and polycarbonate materials. More generally, suitable materials for the sheets include optically-clear materials, preferably with a high index of refraction, and depending on the circumstances under which the sheets are to be used, they can incorporate other materials such as luminescent or fluorescent particles and diffusing particles. However, the sheets may alternatively be translucent and/or incorporate filter materials to filter out unwanted wavelengths of light. The prism structures on the structured side of a sheet can be formed in any suitable manner, including direct cutting, embossing and casting. The size of the prism structures will be determined by the nature of the light source with which a sheet is intended to be used, by the required visual appearance of the sheet and also by the manufacturing process by which it is produced. Typically, when the light source is a spatially-compact source such as a light emitting diode, the R cells may have a height of about 0.2 to 0.3 mm and the R cells may have a width of about 0.1 to 0.15 mm. Moreover, although the prism structures have been described above as having conventional planar facets, similar generally-prismatic structures having curved facets could also be used.

Figure 16:
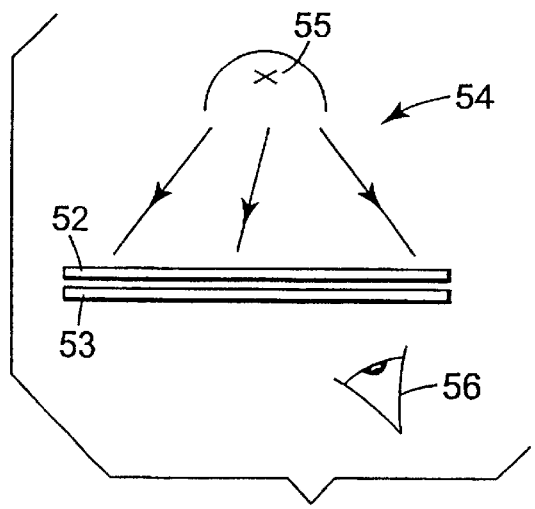
FIG. 16 illustrates the use of two superimposed optical sheets in combination with a light source.
Figure 17:
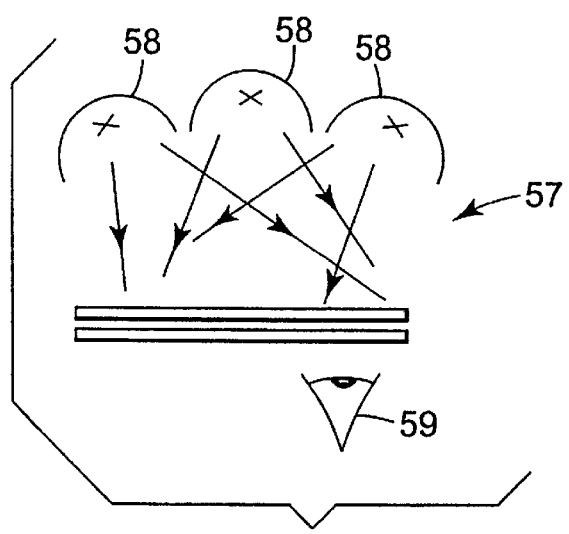
FIG. 17 is similar to FIG. 15 but shows the optical sheets in combination with three light sources.

The use of two overlapped sheets 52, 53 in a luminaire 54 employing a spatially-compact source of light 55 is illustrated diagrammatically in FIG. 16. It has been found that an observer 56 looking at the luminaire 54 will see two sets of parallel lines of light at right angles to each other. The location of the lines will vary with the observer's viewing position and, when the sheets are of the type shown in FIG. 6, will appear to twinkle as the observer moves. In the preferred case in which the prisms on the structured surfaces of the sheets 52, 53 are arranged in a non-ordered way, the set of lines visible to the observer from any particular position will be randomly distributed over the sheets and create very little glare. The effect is multiplied if, as illustrated in FIG. 17, the luminaire 57 employs several light sources 58 since the observer 59 will then see similar, but displaced, sets of parallel lines of light for each source. The effect becomes particularly interesting if the point light sources are of different colours (for example, red, blue and green). In that case, the luminaire will provide white light on the area being illuminated while an observer looking towards the luminaire will see orthogonal sets of parallel lines in the individual colours of the light sources.

Optical sheets in accordance with the invention are particularly suitable for use in luminaires employing spatially-compact light sources such as light-emitting diodes (LEDs), lasers (especially laser diodes), and small incandescent lamps. However, they can also be used with other light sources including metal halide lamps and halogen lamps, and also with more conventional light sources such as larger incandescent lamps and fluorescent tubes generally. When a larger light source is used, the effect of the optical sheet(s) for an observer looking towards the luminaire will be to spread out and disguise, to some extent, the form of the light source. Advantageously, a sheet having linearly-extending prisms as illustrated in FIG. 12 is used with an elongated light source and a sheet with prisms that follow circular paths as illustrated in FIG. 14 is used with a light source of circular form.

Figure 18:
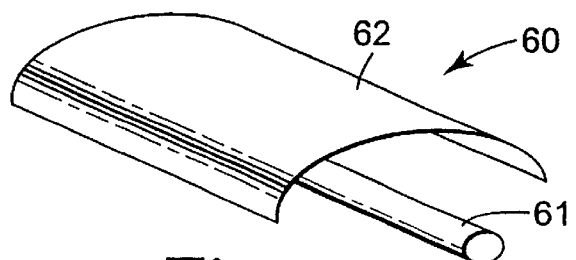
FIG. 18 is a diagrammatic illustration of a luminaire incorporating an optical sheet in accordance with the invention.
Figure 19:
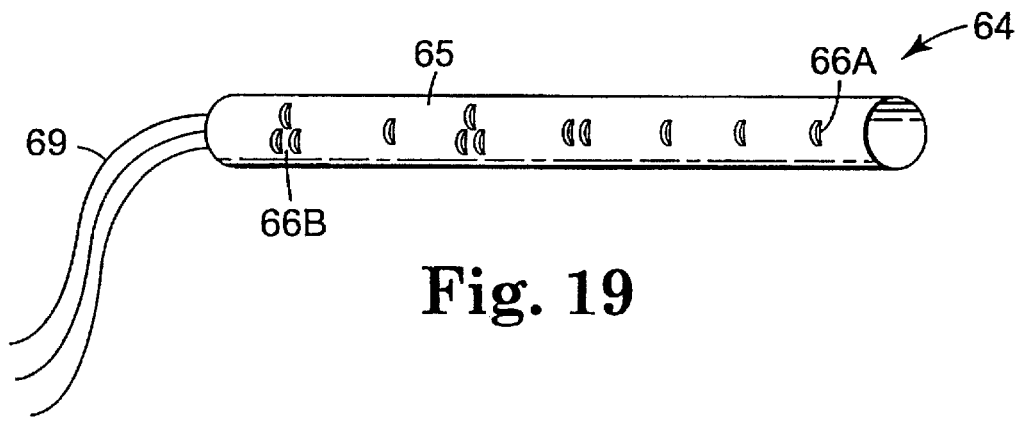
FIG. 19 shows a luminaire intended to include an optical sheet in accordance with the invention.
Figure 20:
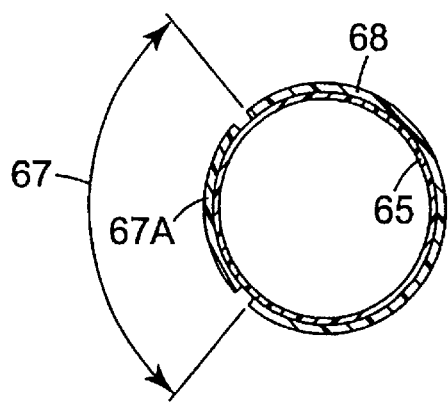
FIG. 20 is a diagrammatic transverse cross-section of the housing of the luminaire of FIG. 19, on an enlarged scale and showing the optical sheet in position.

Other luminaires utilising optical sheets in accordance with the invention are illustrated in FIGS. 18 to 20. The luminaire 60 of FIG. 18 uses an elongated light source 61, for example a conventional fluorescent tube. The surface of the luminaire that is visible to an observer is formed by an optical sheet 62 in accordance with the invention, having linear prism structures as illustrated in FIG. 12. The sheet 62 extends for the length of the light source 61 and is curved to hide the light source from the view of an observer in the area that is being illuminated. The prism structures on the sheet extend parallel to the light source and are on the outside surface of the sheet (i.e. the surface facing away from the light source). The sheet 62 will spread out the light from the source 60 over the area to be illuminated and, for an observer looking at the luminaire, will have the effect of also spreading-out the form of the light source thereby improving the general appearance of the luminaire.

FIGS. 19 and 20 illustrate another elongated luminaire 64 but, in this case, one that uses spatially-compact sources of light (for example LEDs) rather than an elongated source. It comprises a cylindrical housing 65 (shown in FIG. 19) that contains the light sources 66. The light sources 66 (not shown in FIG. 20) are located at intervals (for example, 3 to 5 cms) along the length of the housing 65, either individually as indicated at 66A or in clusters as indicated at 66B (or both). Light is required to be emitted through a window 67 (FIG. 20) of a certain width extending the length of the housing 65 and, to that end, the remainder of the outer curved surface of the housing is covered by a material 68 (omitted from FIG. 19) that will reflect light from the sources 66 back into the housing. Typically, the reflective material (which may be specularly or diffusely reflective) will cover 65 to 75% of the circumference of the housing and one, or both, of the ends of the cylinder may also be covered by the same material. Suitable reflective materials include films available, under the trade designations "Optical Lighting Film" and "Silverlux Film", from Minnesota Mining and Manufacturing Company of St. Paul, Minn., USA, and also films as described in U.S. Pat. Nos. 5,882,774 and 5,976,686. However, other reflective materials such as aluminium and white paint could also be used. The housing window 67 is covered by an optical sheet 67A in accordance with the present invention (also omitted from FIG. 19), positioned so that the prisms extend around the tube and thereby function to spread the light from the sources 66 along the length of the tube. The optical sheet 67A, which is preferably of the type shown in FIG. 6 or FIG. 7, is also omitted from FIG. 19.

If desired, the reflective material 68 could be omitted from the luminaire 64, and the optical sheet material 67A extended around the entire circumference of the housing 65 so that light from the sources 66 will be emitted through 360°.

The housing 65 may be a solid optically-clear plastic (e.g. acrylic) material in which the light sources 66 are encapsulated or, as illustrated in FIG. 20, it may simply be a hollow optically-clear pipe within which the light sources are located. The power supply wiring 69 for the light sources 66 enters the housing 65 at one end and preferably also provides for continuous control of the light output of the sources 66. For example, when the light sources 66 are LEDs, they may be employed in clusters of different colours enabling a variety of different lighting effects to be achieved by controlling the LEDs individually. The LEDs may be powered by a battery pack or via a low voltage DC transformer (not illustrated).

A luminaire of the type shown in FIGS. 19 and 20, in which the light sources 66 are LEDs, offers the advantage of being particularly robust (especially when the LEDs are encapsulated in a solid plastic housing 65) and of at least matching the energy efficiency, expected lifetime and low heat generation of fluorescent lights. In certain applications, the housing 65 may be formed from a material that has a degree of flexibility so that the light is also capable of bending to a certain extent. It will be understood that, although the use of LEDs as the light sources 66 is advantageous, other light sources could be used including electroluminescent materials, light-emitting polymers, laser diodes, fluorescent lamps and halogen lamps.

Figure 21:
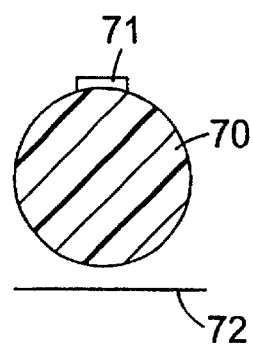
FIG. 21 is a diagrammatic transverse cross-section of a light fibre used in combination with an optical sheet in accordance with the invention.

In an alternative lighting arrangement, an optical sheet in accordance with the invention may be used to spread the light emitted by a light fibre. That is illustrated in FIG. 21 which shows, diagrammatically, a light fibre 70 supplied with light from a source (not shown) at one end of the fibre. Light extraction elements 71 on one side of the fibre cause light to be emitted in a controlled manner from the fibre on the diametrically-opposite side thereof. An optical sheet 72 in accordance with the invention is positioned on that side of the fibre, with the elongated prisms extending parallel to the fibre, to spread the emerging light with the required angular distribution.

Optical sheets in accordance with the invention have particular utility in illumination systems, using either artificial or natural light, when high efficiency and precise control over the spread of the light are important. They can, for example, be used in high power luminaires for large buildings such as exhibition halls where lighting costs are significant and good illumination is demanded. A luminaire suitable for use in such situations, in which the optical sheets of the present invention can be employed, Likewise, the optical sheets can be used in luminaires using LEDs for street lighting to provide efficient, controlled, illumination of selected areas of road and/or pavement surfaces. In daylighting applications, optical sheets in accordance with the invention can be used to spread light emerging from the end of solar light pipes or may simply be laminated to skylight windows to eliminate glare and spread the light in a controlled manner over the floor area below. In all of those applications, a suitable selection of the prisms forming the structured surface of a sheet enables the light emerging from the film to be directed into a variety of forms ranging from narrow beams to a wide (e.g. Lambertian) distribution.

It has already been described that optical sheets in accordance with the invention, in addition to spreading light efficiently, also have a distinctive/decorative appearance when positioned in front of a light source particularly when two sheets are used one on top of the other. It has, in fact, been noted that the distinctive/decorative appearance is also present if the light source is positioned on the structured side of a sheet and the latter is viewed from the smooth side, although in those circumstances the light transmission efficiency of the sheet may be reduced. It follows that an appearance similar to that of two overlapped sheets with mutually orthogonal prism structures, could be obtained using a single sheet of material with a respective prism structure formed in each of the major surfaces.

It will be understood from the previous paragraph that optical sheets in accordance with the invention can also be used in circumstances in which the distinctive appearance of the sheets rather than their light-spreading function is important. For example, optical sheets in accordance with the invention could be provided with a reflective backing material and used as automotive and aerospace trim materials and as barrier delineation materials, or simply for decorative purposes. When used in that manner, the viewer is positioned on the same side of the sheet as the light source rather than on the opposite side as in FIGS. 16 to 21. When employed for its distinctive/decorative appearance, sheet material in accordance with the invention is especially effective when there is relative motion between the light source and the sheet, or when there is a change in the angle with respect to the viewer.

What is claimed is:

1. An optical sheet suitable for spreading light, in which a first major surface of the sheet is a structured surface comprising an array of prisms such that, if the second major surface of the sheet is substantially smooth, a normally-incident beam of light that enters the sheet through the second major surface and leaves through the array of prisms will be spread by the latter;

wherein the array comprises:

(a) a plurality of reflection prisms selected to deviate the normally-incident light through different angles and a plurality of refraction prisms selected to deviate the normally-incident light through different angles, in which successive reflection prisms are separated by at least one refraction prism; or (b) a non-ordered arrangement of a plurality of reflection prisms selected to deviate the normally-incident light through different angles; or (c) a non-ordered arrangement of a plurality of refraction prisms selected to deviate the normally-incident light through different angles;

in which each refraction prism deviates the normally-incident light only by refraction at a prism facet as the light leaves the sheet through the first major surface and each reflection prism deviates the normally-incident light by total internal reflection within the prism before the light leaves the sheet through the first major surface.

2. An optical sheet as claimed in claim 1, in which the array comprises alternating reflection and refraction prisms.

3. An optical sheet as claimed in claim 1, in which the array comprises a non-ordered arrangement of alternating reflection and refraction prisms.

4. An optical sheet as claimed in claim 1, in which the second major surface of the sheet is substantially smooth.

5. An optical sheet suitable for spreading light, in which a first major surface of the sheet is a structured surface comprising an array of prisms and the second major surface of the sheet is substantially smooth, whereby a normally-incident beam of light that enters the sheet through the second major surface and leaves through the array of prisms will be spread by the latter;

wherein the array comprises:

a non-ordered arrangement of a plurality of reflection prisms selected to deviate the normally-incident light through different angles and a plurality of refraction prisms selected to deviate the normally-incident light through different angles, in which successive reflection prisms are separated by at least one refraction prism;

in which each refraction prism deviates the normally-incident light only by refraction at a prism facet as the light leaves the sheet through the first major surface and each reflection prism deviates the normally-incident light by total internal reflection within the prism before the light leaves the sheet through the first major surface.

6. An optical sheet as claimed in claim 5, in which the first major surface comprises a further identical array of prisms.

7. An optical sheet as claimed in claim 5, in which at least some of the prisms are triangular in cross-section.

8. An optical sheet as claimed in claim 5 in which at least some of the prisms have more than two facets wherein a first facet projects from the sheet at a first angle to the plane of the sheet and a second facet extends from the first facet outwardly with respect to the sheet at an angle to the plane of the sheet which is less than said first angle.

9. An optical sheet as claimed in claim 5, in which the width and/or depth of the prisms varies across the structured surface.

10. An optical sheet as claimed in claim 5, in which at least some of the prisms are asymmetrical.

11. An optical sheet as claimed in claim 10 in which the asymmetric prisms each have one facet that is approximately normal to the plane of the sheet.

12. An optical sheet as claimed in claim 5, in which the prisms extend linearly across the sheet.

13. An optical sheet as claimed in claim 5, in which the prisms extend in a curved path across the sheet.

14. A luminaire comprising an optical sheet as claimed in claim 5 in combination with at least one light source.

15. A luminaire as claimed in claim 14, in which the light source is positioned so that light from the source is directed through the sheet from the second major surface thereof.

16. A luminaire as claimed in claim 14, in which the light source is a light emitting diode or a laser diode or a fluorescent lamp or an incandescent lamp.

17. A luminaire comprising a plurality of spatially-compact light sources positioned within, and along the length of, an elongate housing to emit light through a window in the housing, wherein the window contains an optical sheet as claimed in claim 5 for spreading the light passing there through.

* * * * *